US012569393B2

(12) United States Patent
Lerner et al.

(10) Patent No.: US 12,569,393 B2
(45) Date of Patent: Mar. 10, 2026

(54) CABLE-ACTUATED, KINETICALLY-BALANCED, PARALLEL TORQUE TRANSFER EXOSKELETON JOINT ACTUATOR WITH OR WITHOUT STRAIN SENSING

(71) Applicant: Arizona Board of Regents on Behalf of Northern Arizona University, Flagstaff, AZ (US)

(72) Inventors: Zachary F Lerner, Flagstaff, AZ (US); Grigoriy Orekhov, Flagstaff, AZ (US)

(73) Assignee: Arizona Board of Regents on Behalf of Northern Arizona University, Flagstaff, AZ (US)

( * ) Notice: Subject to any disclaimer, the term of this patent is extended or adjusted under 35 U.S.C. 154(b) by 920 days.

(21) Appl. No.: 17/343,628

(22) Filed: Jun. 9, 2021

(65) Prior Publication Data

US 2021/0378904 A1 Dec. 9, 2021

Related U.S. Application Data

(60) Provisional application No. 63/036,618, filed on Jun. 9, 2020.

(51) Int. Cl.
| | |
|---|---|
| *A61H 3/00* | (2006.01) |
| *A61H 1/02* | (2006.01) |
| *B25J 9/00* | (2006.01) |

(52) U.S. Cl.
CPC ............. *A61H 3/00* (2013.01); *A61H 1/0266* (2013.01); *B25J 9/0006* (2013.01); (Continued)

(58) Field of Classification Search
CPC ...................... A61H 3/00; A61H 3/008; A61H 1/0237–0266; A61H 2201/149; (Continued)

(56) References Cited

U.S. PATENT DOCUMENTS

| | | | |
|---|---|---|---|
| 2008/0156363 A1* | 7/2008 | Ikeuchi | A61H 3/008 |
| | | | 135/65 |
| 2010/0063424 A1 | 3/2010 | Kudoh et al. | |

(Continued)

FOREIGN PATENT DOCUMENTS

| | | | |
|---|---|---|---|
| CN | 110575366 | 12/2019 | |
| EP | 1902700 A1 * | 3/2008 | ........... A61H 1/0237 |

OTHER PUBLICATIONS

Lerner Untethered ankle exoskeleton (published in IEEE Transactions on Neural Systems and Rehabilitation Engineering, vol. 26, No. 10, Oct. 2018 (Year: 2018).*

*Primary Examiner* — Bradley H Philips
*Assistant Examiner* — Kira B Daher
(74) *Attorney, Agent, or Firm* — Quarles & Brady LLP

(57) ABSTRACT

A low-weight, high performance wearable assistive device for assisting motion of a joint of a wearer (e.g., an ankle) and/or resistance training of motion of the joint includes a lightweight upright member that may be attached to the wearer (e.g., fastened to the wearer's outside calf). Forces to assist or resist movement of the joint are coupled to a rotation bearing via cables. The bearing is disposed within the upright member such torsional deflection of the device under load is reduced, allowing the upright member to be lighter and/or less obtrusive to the wearer and less susceptible to failure.

17 Claims, 10 Drawing Sheets

(52) U.S. Cl.
  CPC .................. *A61H 2201/149* (2013.01); *A61H 2201/1642* (2013.01); *A61H 2201/165* (2013.01); *A61H 2201/5061* (2013.01)

(58) Field of Classification Search
  CPC ...... A61H 2201/1642; A61H 2201/165; A61H 2201/5061; A61H 2201/1215; A61H 2201/5007; A61H 2003/007; B25J 9/006; B25J 9/0078
  See application file for complete search history.

(56) References Cited

U.S. PATENT DOCUMENTS

| | | | |
|---|---|---|---|
| 2011/0028871 A1 | 2/2011 | Shishido | |
| 2011/0214524 A1* | 9/2011 | Jacobsen | A61H 1/0266 |
| | | | 901/21 |
| 2011/0295164 A1 | 12/2011 | Jacobsen et al. | |
| 2012/0289870 A1 | 11/2012 | Hsiao-Wecksler et al. | |
| 2013/0158444 A1* | 6/2013 | Herr | A61H 1/0266 |
| | | | 601/23 |
| 2014/0202040 A1 | 7/2014 | Van Horne et al. | |
| 2014/0260950 A1* | 9/2014 | Cook | A61H 3/00 |
| | | | 91/418 |
| 2016/0139666 A1* | 5/2016 | Rubin | G06F 3/012 |
| | | | 345/633 |
| 2016/0296345 A1 | 10/2016 | Deshpande et al. | |
| 2016/0339583 A1* | 11/2016 | Van Engelhoven | B25J 9/0006 |
| 2017/0202724 A1* | 7/2017 | De Rossi | A61H 3/00 |
| 2018/0008501 A1* | 1/2018 | Choi | A61H 3/00 |
| 2018/0085277 A1* | 3/2018 | Julin | A61F 5/0102 |
| 2018/0161230 A1* | 6/2018 | Maekita | A61B 5/4836 |
| 2019/0015287 A1* | 1/2019 | Witte | A61H 1/024 |
| 2019/0192373 A1 | 6/2019 | Vouga et al. | |
| 2019/0232485 A1 | 8/2019 | Reese | |
| 2019/0282424 A1 | 9/2019 | Lerner | |
| 2020/0375776 A1 | 12/2020 | Thor et al. | |

* cited by examiner

510

CABLE-ACTUATED, KINETICALLY-BALANCED, PARALLEL TORQUE TRANSFER EXOSKELETON JOINT ACTUATOR WITH OR WITHOUT STRAIN SENSING

CROSS-REFERENCE TO RELATED APPLICATIONS

This application claims priority to U.S. Provisional Application 63/036,618 entitled "Cable-Actuated, Kinetically-Balanced, Parallel Torque Transfer Exoskeleton Joint Actuator With or Without Strain Sensing" and filed on Jun. 9, 2020, the disclosure of which is incorporated in its entirety herein by reference.

STATEMENT CONCERNING FEDERALLY-FUNDED RESEARCH

This invention was made with government support under Grant No. 1R15HD099664 from the National Institutes of Health/National Institute of Child Health and Human Development. The government may have certain rights in the invention.

BACKGROUND OF THE INVENTION

A number of injuries or conditions can lead to disorders that affect muscle control. Individuals with muscle control disorders frequently experience a downward trend of reduced physical activity and worsening of gait function leading to a permanent decline in ambulatory ability. Accordingly, it is desired to develop methods, implementations, and devices for gait rehabilitation.

BRIEF SUMMARY

Embodiments of the invention are directed to a powered orthosis for assisting with ankle motion. The orthosis includes an actuator, e.g., a motor, a transmission linkage, e.g., a set of Bowden cables, a pair of extended vertical members coupled to a user's leg via, e.g., a calf cuff. A rotatable bearing is mounted within the member, and is rotatable by a pulley connected to the cables. The bearing is coupled to a footplate, and is rotatable in a plantar direction or a dorsal direction depending on the tension applied to the cables by the actuator. In certain embodiments, the extended vertical member is a tubular member having a closed, circumferential cross section, and the bearing is located within the interior space defined by the walls or wall of the tubular member. In one example, the bearing is located along a centerline or a long axis of the interior member. In certain embodiments, the pulley has a maximal outer dimension that exceeds a maximal outer dimension of the tubular member. In such embodiments, apertures are provided in the walls of the tubular member allowing passage of the pulley sheave during operation, and the pulley sheave has a removable portion that enables it to be assembled into the tubular member.

In certain embodiments, the tubular member is mounted on a distal side of the calf cuff, such that the tubular member, pulley, bearing, and transmission linkage are all located on the distal side of a user's leg. This arrangement is advantageous because it eliminates assistive hardware from the medial side of the user's leg, where it might interfere with a user's gait.

In one embodiment, a wearable assistive device has an extended, tubular structural member having a closed circumferential cross section, a first end and a second end defining a long axis through a center of the extended structural member. The device also has a rotational bearing disposed within the extended structural member and positioned on the long axis near the second end of the extended structural member. The device also has an extension cable having a first end coupled to an actuator and a second end coupled to the rotational bearing; and a retraction cable having a first end coupled to the actuator and a second end coupled to the rotational bearing. When the extension cable is pulled toward the actuator, the rotational bearing experiences a torque that tends to rotate the rotational bearing in a first direction, and when the retraction cable is pulled toward the actuator, the rotational bearing experiences a torque that tends to rotate the rotational bearing in a second direction.

Certain embodiments include an insole bracket coupled to the rotatable bearing and dimensioned to support a foot of a wearer of the assistive device. When the rotational bearing the rotational bearing experiences a torque that tends rotate the rotational bearing in the first direction, the insole bracket exerts a torque on an ankle of the user that assists dorsiflexion of the foot of the wearer and opposes plantar flexion of the foot of the wearer. When the rotational bearing the rotational bearing experiences a torque that tends to rotate the rotational bearing in the second direction, the insole bracket exerts a torque on the ankle of the wearer that assists plantar flexion of the foot of the wearer and opposes dorsiflexion of the foot of the wearer.

In the some embodiments, the extended structural member is configured such that when a torque of 0-75 Newton-meters is applied to the rotational bearing a deflection of the second end of the extended structural member measured with respect to the long axis is less than 5 degrees.

In certain embodiments, the extended structural member comprises a carbon fiber reinforced polymer composite. In other embodiments, the extended structural member has a polygonal cross section. For some embodiments, the extended structural member's cross section has a maximal external dimension that varies with distance from the first end. In other embodiments, the maximal external dimension of the extended structural member's cross section is less than 5 inches. In some embodiments, the extended structural member has a weight per unit length of less than 1.5 grams per mm.

Certain embodiments are directed to a wearable assistive device with a torque sensor or a rotation sensor coupled to a rotational bearing and configured to generate a signal indicating a net torque experienced by the rotational bearing or a degree of rotation of the rotational bearing. Some embodiments further include a signal wire connected to the torque or rotation sensor that extends within the extended structural member and connects to a controller near the first end of the extended structural member.

In some embodiments, the device has a force sensor disposed on or within the insole bracket, which is configured to generate a signal indicating a force applied by the foot of the user to the insole bracket. Such embodiments may have a signal wire connected to the force sensor that extends within the extended structural member and connects to a controller near the first end of the extended structural member.

In certain embodiments, the extension and retraction cables are Bowden cables, each having an inner cable within a flexible outer sheath extending from at least the first end of the extended structural member toward the second end of the extended structural member and terminated in a barrel connector coupled to the extended member near the rotational bearing. The inner cable is terminated at a pulley coupled to the bearing. The flexible outer sheath may be configured to resist compressive force when vertically oriented.

Some embodiments include a pulley sheave coupled to the rotational bearing and configured to rotate with the rotational bearing. The second ends of the extension and retraction cables are coupled to the pulley sheave. In some embodiments, the second end of the extension cable and the second end of the retraction cable may be coupled to each other.

In certain embodiments, the pulley sheave has a maximal outer dimension that is greater than a maximal outer dimension of the extended structural member, and the extended structural member includes an opening between a location of the rotational bearing and the first end through which a portion of the pulley sheave is configured to pass. In other embodiments, the pulley sheave has a maximal outer dimension and the extended structural member has an interior dimension such that the pulley sheave is located entirely within the extended tubular member during all states of rotation For some embodiments, an upper portion of the pulley sheave is configured to be detachable from the pulley sheave to form a gap in the pulley sheave.

In certain embodiments, the device includes a calf cuff. The extended tubular member is rigidly mounted to a distal side of the calf cuff such that the extended tubular member, extension and retraction cables and the bearing are all arranged on a distal side of a user's leg when the device is worn.

The above features and advantages of the present invention will be better understood from the following detailed description taken in conjunction with the accompanying drawings.

BRIEF DESCRIPTION OF THE DRAWINGS

The drawings described herein constitute part of this specification and includes example embodiments of the present invention which may be embodied in various forms. It is to be understood that in some instances, various aspects of the invention may be shown exaggerated or enlarged to facilitate an understanding of the invention. Therefore, drawings may not be to scale.

DETAILED DESCRIPTION

The described features, advantages, and characteristics may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment. References to "users" refer generally to individuals accessing a particular computing device or resource, to an external computing device accessing a particular computing device or resource, or to various processes executing in any combination of hardware, software, or firmware that access a particular computing device or resource. Similarly, references to a "server" refer generally to a computing device acting as a server, or processes executing in any combination of hardware, software, or firmware that access control access to a particular computing device or resource.

Figure 1:
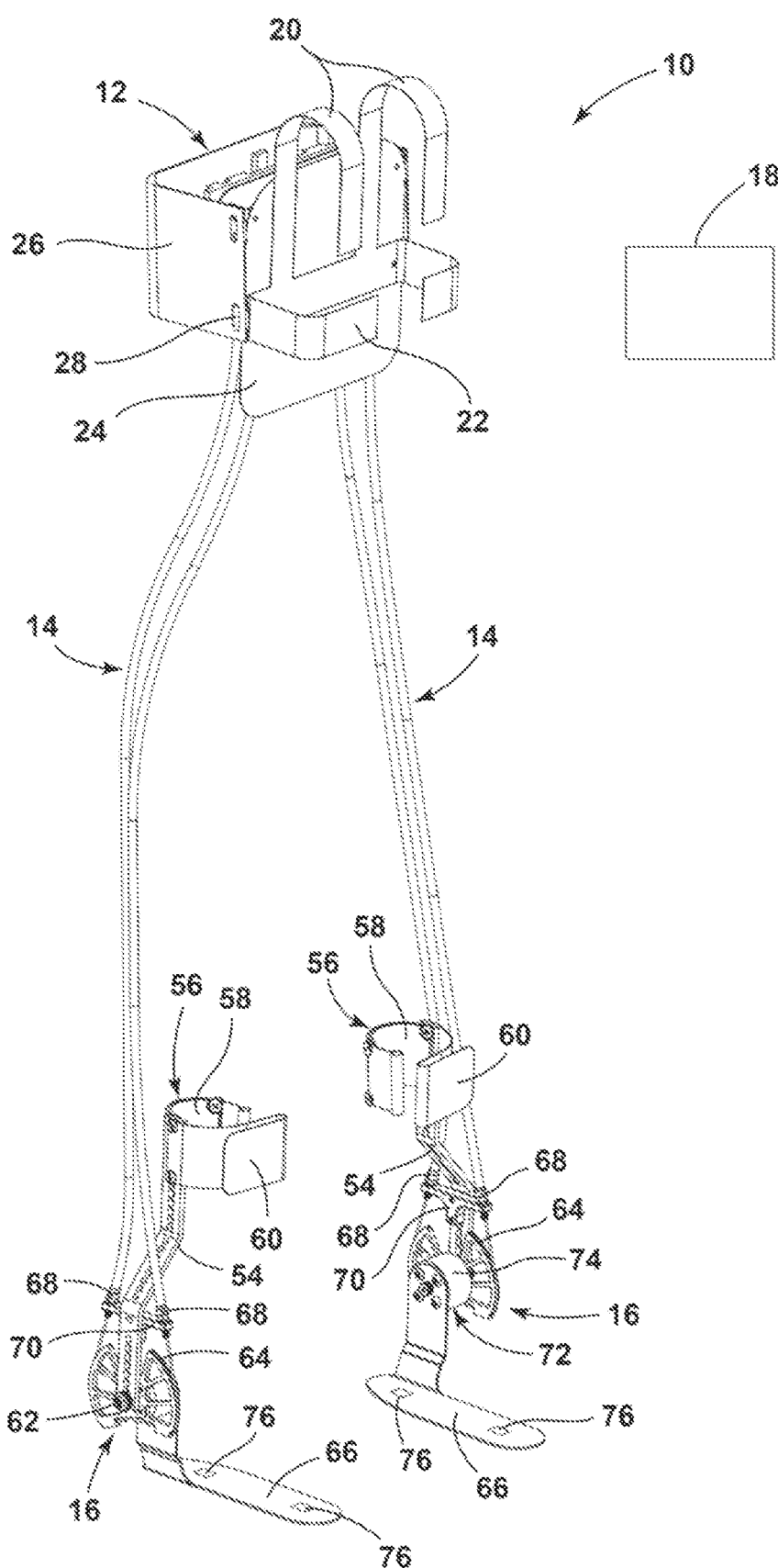
FIG. 1 is a front isometric view of a wearable exoskeleton device; according to some embodiments.
Figure 2:
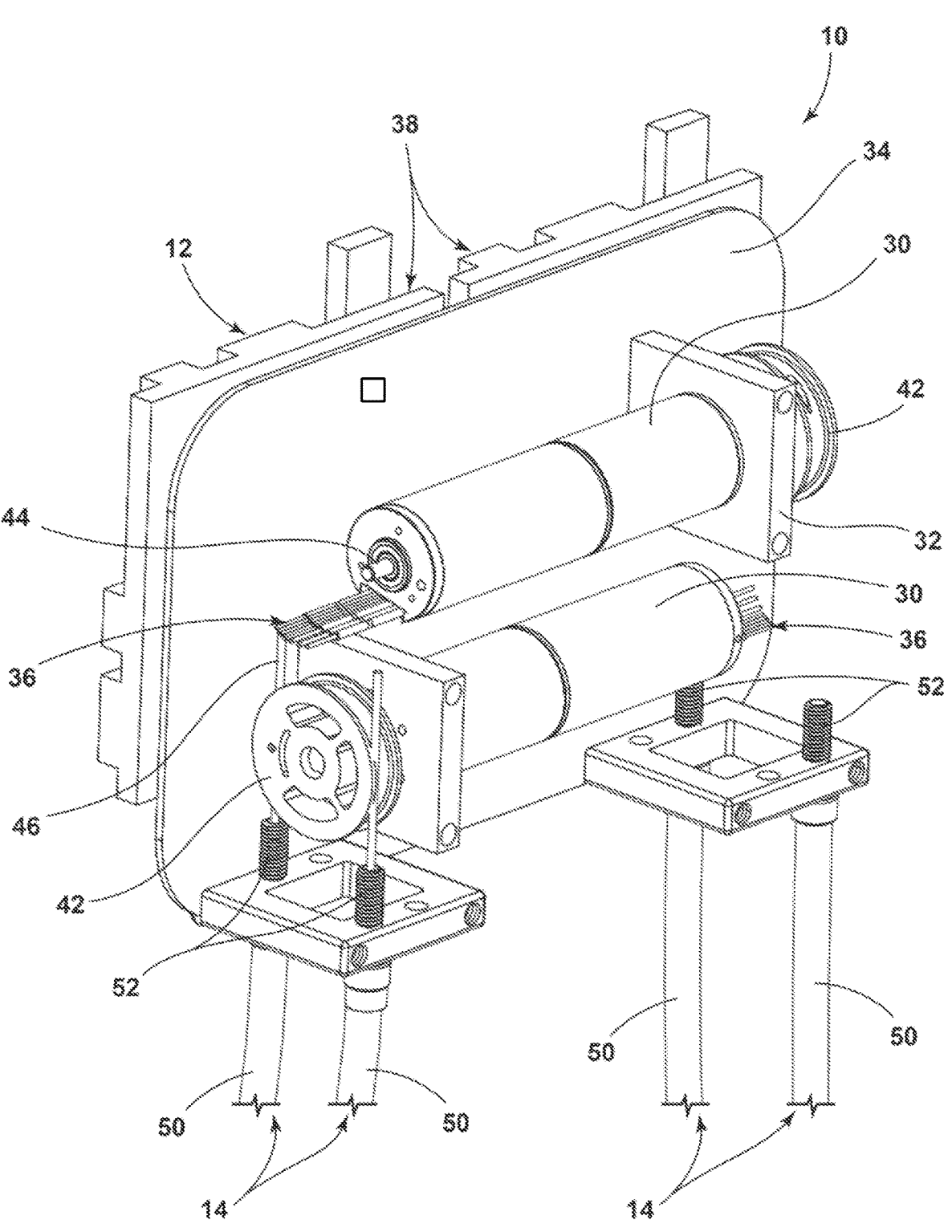
FIG. 2 is a front isometric view of a control unit of the exoskeleton device of FIG. 3, according to some embodiments.
Figure 3:
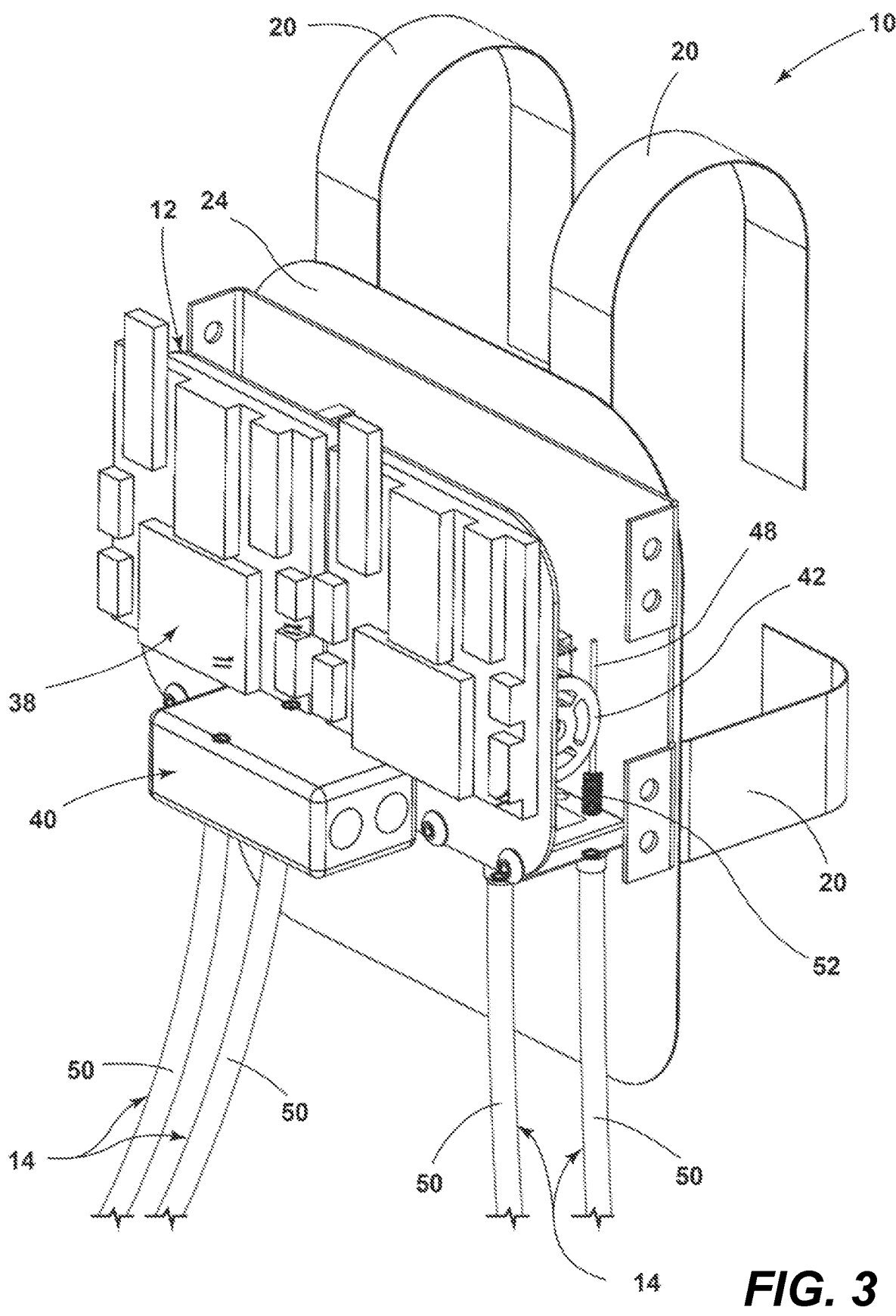
FIG. 3 is a rear isometric view of the exoskeleton device of FIG. 3, according to some embodiments.
Figure 4:
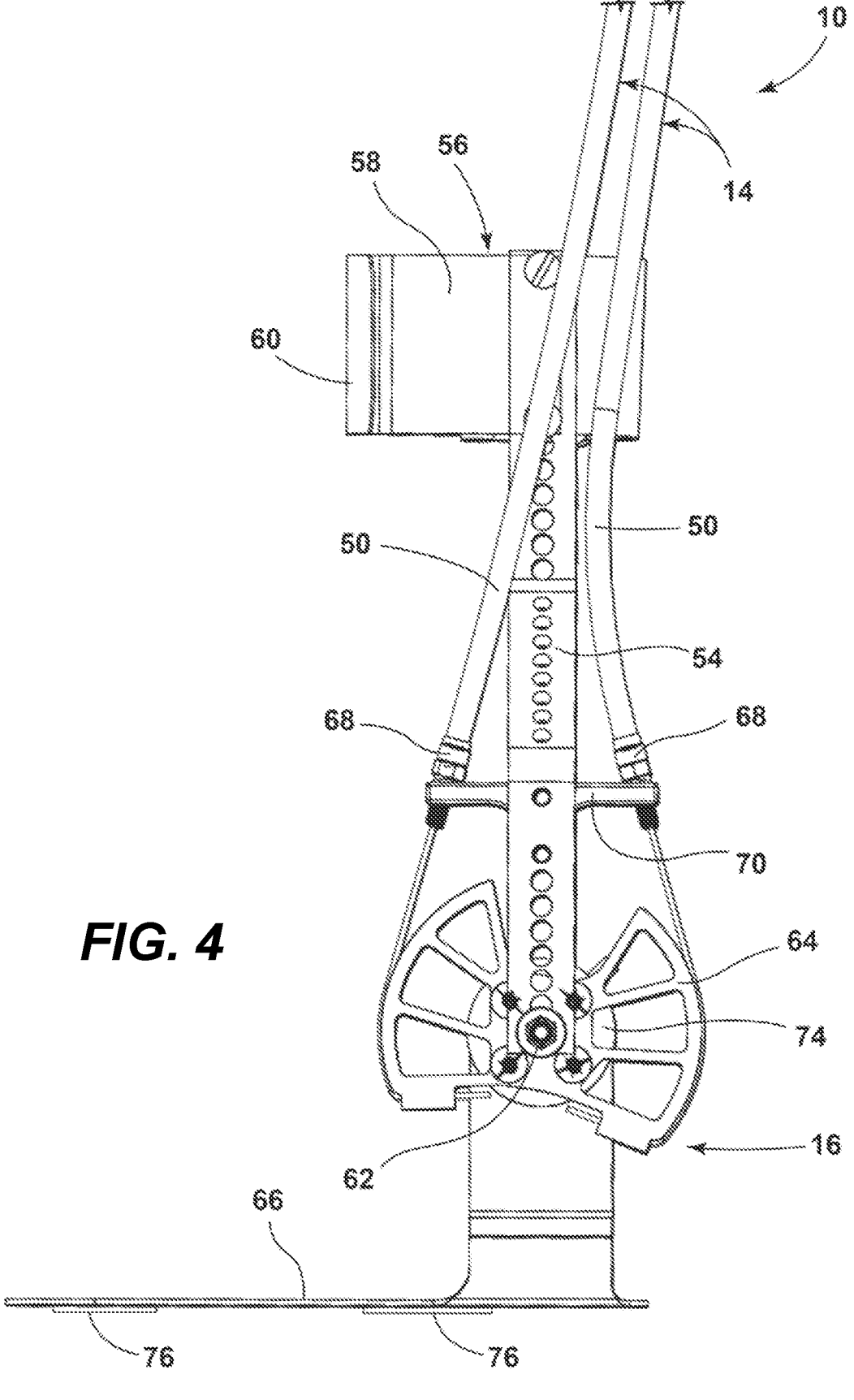
FIG. 4 is a side plan view of a lower hinged assembly that is operably coupled with the control unit through a transmission assembly, according to some embodiments.
Figure 5:
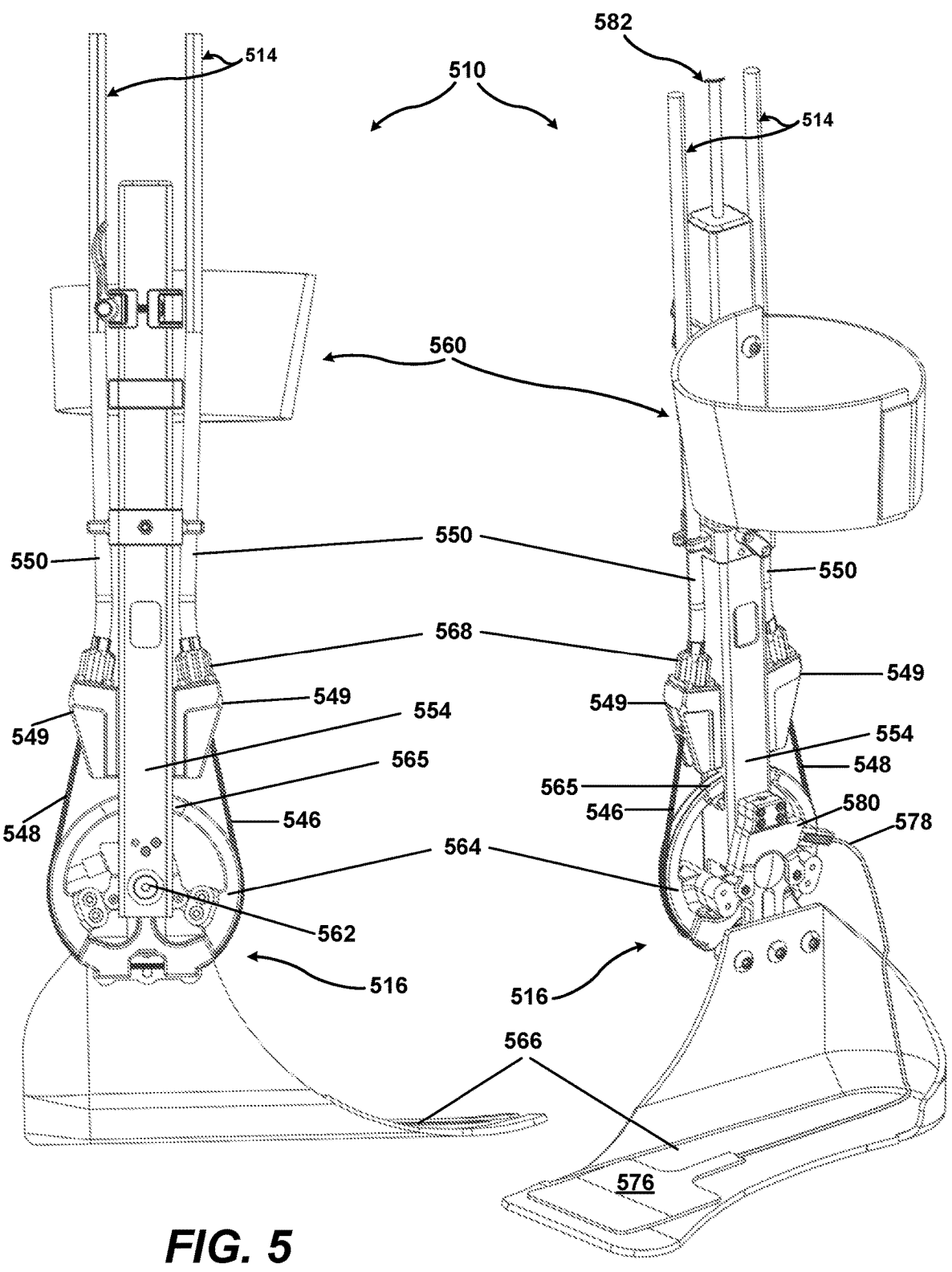
FIG. 5 is an outer side elevation view and inner side isometric view of a wearable exoskeleton device according to additional embodiments.

For purposes of description herein, the terms "upper," "lower," "right," "left," "rear," "front," "vertical," "horizontal," and derivatives thereof shall relate to the embodiment of the invention as oriented in FIG. 3. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if any assembly or composition is described as containing components A, B, and/or C, the assembly or composition can contain A alone; B alone; C alone; A and B in combination; A and C in combination; B and C in combination; or A, B, and C in combination.

As used herein, the terms "assistance" and "resistance" may be used interchangeably to signify the direction of external torque applied to a joint that may be perceived as augmenting (making a movement easier, assistance) or harder (resistance).

The following disclosure describes exoskeleton devices and methods of utilizing an exoskeleton device to provide powered assistance designed to increase mobility or facilitate rehabilitation in a user. The powered exoskeleton device is a wearable, mobile device that allows a user to perform limb motions with additional external power, for increasing a user's strength or endurance. The powered exoskeleton device may operate specifically to facilitate rehabilitation, providing resistance for targeted and functional strengthening. The device may also operate specifically to increase mobility, providing assistance, aiming to enhance or augment the user's capabilities. The exoskeleton device may be used during daily life and may offer a transformative new option for improving mobility by reducing barriers to physical activity, such as for individuals with neurologically-based gait disorders. The barriers to mobility faced by individuals (e.g. individuals with gait deficits) may include prohibitively high metabolic cost of transport and difficulty completing strength- and balance-intensive weight-bearing tasks such as navigating stairs and around or over obstacles. For improving gait mechanics and walking efficiency, robotic joint (e.g. ankle, knee, hip, and/or any other joint) actuation can provide positive power to the body through appropriately-timed assistance (e.g. extension/contraction assistance). For increasing functional strength, robotic joint actuation may resist a movement or targeted muscle group, including powered resistance that is proportional to the instantaneous demand on the joint (i.e. net muscle moment).

The wearable exoskeleton device enables new methods for improving walking ability. For example, the exoskeleton device provided herein may include techniques (e.g. real-time biofeedback) to encourage favorable changes in volitional muscle activity patterns.

The ankle joint plays a critical role in whole-body stability and forward propulsion during walking. Dynamic ankle actuation and stability control are required for independent and effective function at home and in the community. Assistance at or near the ankle joint appears to provide improvement in walking economy and has the potential to reduce the metabolic cost of transport. Likewise, dynamic or intermittent actuation and stability of a knee joint can also be required, which may be improved by providing assistance at or near the joint. Other movements of the body may likewise be improved by providing assistance near various other joints of the body. This type of powered assistance may seek to maintain and ultimately augment the wearer's range of motion and muscle strength. Furthermore, by offering the potential to reduce the metabolic cost of activity (e.g. walking), powered joint assistance may lead to increases in habitual physical activity.

In some embodiments, for improving gait mechanics and walking efficiency, robotic actuation can provide positive power to the body through appropriately-timed assistance (e.g. plantar-flexion assistance) during the walking process.

For improving performance during balance-intensive tasks, an exoskeleton device (e.g. an ankle exoskeleton device) can respond rapidly to perturbations or abrupt changes in posture by modulating joint torque, and therefore joint impedance, in real-time, to help maintain balance.

In some embodiments, an exoskeleton device may provide assistance during some modes of operation intended to improve mobility or posture in the form of linear force and/or rotational force (i.e. torque). Alternatively, the exoskeleton may provide resistance a mode of operation designed to increase muscle recruitment during a function task (e.g. walking) in the form of linear force and/or rotational force (i.e. torque). The assistance or resistance may be provided to various hinged assemblies of the exoskeleton device. The electronic assistance may be provided by a powered ankle-foot orthosis (AFO), a knee assembly, and/or any other joint assembly that is coupled with a control unit through a transmission assembly. For example, FIGS. 1-4 illustrate various embodiments of the exoskeleton device 10 that includes a control unit 12, a transmission assembly 14, and a pair of hinged assemblies 16. In the illustrated embodiment, the exoskeleton device 10 includes two lower hinged assemblies 16 for a right foot and a left foot of a user. Each of the lower hinged assemblies 16 is configured as an AFO.

In some embodiments, the exoskeleton device 10 may also include a feedback modality 18 for providing feedback regarding the individual's use of a wearable exoskeleton device 10 in a free-living environment. In some instances, a method for providing feedback to an individual using a prosthesis utilizes a computer monitor mounted at line-of-sight in front of a treadmill that provides a near real-time visual display of desired biomechanical parameters and the individual's compliance or non-compliance with these parameters. However, as can readily be determined, this type of feedback can be incompatible with use outside of a rehabilitation facility and in free-living settings. Accordingly, in some embodiments, the exoskeleton device 10 may utilize other methods for providing feedback that include auditory feedback via speakers or headphones or earbuds, vibrotactile feedback via small vibration actuators, and/or wearable visual feedback via body-warn displays (e.g. wrist mounted monitor or LEDs).

In the embodiment illustrated in FIGS. 1-4, a control unit 12 includes attachment straps 20 used to attach the control unit 12 to an individual or a user (e.g. along a user's back). In some examples, the straps 20 may include first and second vertical straps along with a waist strap. Any of the straps 20 may be attached to one another on one or both end portions thereof. Moreover, the waist strap may include a buckle 22 that allows for engagement of two end portions of the strap and adjustability as to the length of the strap 20. The straps 20 may be flexible or rigid. The attachment straps 20 may additionally or alternatively be of a waist strap form, a backpack form, or any other structure for supporting weight on the user's waist, torso, or other attachment site.

In the embodiment of FIGS. 1-4, the attachment straps 20 are operably coupled to a base plate 24. The base plate 24 may provide a surface for mounting or supporting components of the control unit 12 such as a housing shell 26, which may serve to cover or protect internal components of the control unit 12 from direct view or interference. The housing shell 26 may include be formed from covering material (e.g. plastic, aluminum, cloth) suitably arranged to cover the control unit 12 and can have any design disposed thereon. The base plate 24 may be coupled to the housing shell 26 by a plate-to-housing attachment feature 28. This plate-to-housing attachment feature 28 may include correspond engagement features and/or removable fasteners, with examples including bolts, magnets, clips, and slots. In some embodiments, the base plate 24 and the housing shell 26 may be embodied as an integral component, which may include a single piece or multiple pieces.

The control unit 12 may include one or more actuators 30 that can be supported on the actuator base plate 24. The one or more actuators 30 may generate force through a rotary electric motor, linear electric motor, hydraulic piston, pneumatic piston, pneumatic bladders, combinations thereof, and/or any other device capable of generating a force. The one or more actuators 30 are coupled to the base plate 24 through one or more brackets. The one or more actuator brackets 32 may be formed from a metallic, polymeric, or other suitable material for securing the one or more actuators 30 to the base plate 24. A top plate 34 may be positioned on an opposing side of the one or more actuators 30 from the base plate 24. The one or more actuator brackets 32 may attach to the base plate 24, the one or more actuators 30, or to the top plate 34 through removable or non-removable fasteners (e.g., bolts, clips, slots).

Actuator wiring 36 may electrically couple with the one or more actuators 30 and is configured to carry electrical power or electrical control signals to and from the one or more actuators 30 to a circuit board 38 and/or components thereof. The one or more circuit boards 38 may include one or more printed circuit boards (PCBs), mounting one or more circuits or chips, for performing one or more functions described herein. The one or more circuit boards 38 may be removably or non-removably coupled to the top plate 34 through fasteners, such as bolts, clips, slots, or other fasteners. In an alternate embodiment, the one or more circuit boards 38 may be coupled to one or more other components within the control unit 12.

The circuit board can include various electrical components, such as memory, processors, controllers, transceivers, and/or any other device. The various electrical components may have power supplied thereto by one or more batteries that are also supported by the control unit. For example, in the embodiment illustrated in FIGS. 1-4, one or more batteries 40 are coupled to the top plate 34, to the circuit board 38, or to any other component of the control unit 12 by removable or non-removable attachments (e.g. brackets or bolts). The one or more batteries 40 may be any device capable of storing and delivering electrical power, with examples including nickel cadmium, nickel metal hydride, lithium ion, lead acid, alkaline, lithium batteries, and so on. The one or more batteries 40 may be rechargeable or single use. The control unit 12 may further include circuitry and components for connecting and rectifying external electrical power received from external sources to recharge the one or more batteries 40, in some embodiments.

The first actuator can include a first shaft extending therefrom and the second actuator includes a second shaft extending therefrom, the first and second shafts extending in substantially opposing directions within the control unit. Each actuator can be coupled to one or more pulleys or other devices for assisting in translating movement of the actuator to a movement in a different direction. For example, in the embodiment illustrated in FIGS. 1-4, one or more actuator pulleys 42 are double-wrap side-hole pulleys. The pulleys 42 are generally axially aligned with a shaft 44 of the actuator 30 and rotates in conjunction with each respective actuator 30. In some embodiments, the one or more actuator pulleys 42 may be any suitable device for transferring force from the one or more actuators 30 to a transmission assembly 14.

The force generated by the one or more actuators can be carried by one or more transmission elements of the transmission assembly. The transmission elements are configured to provide force to various elements of the exoskeleton device that can be remote from the control unit. For example, cams, linear shafts, pistons, universal joints, and other force-transferring linkages may be implemented. In embodiment illustrated in FIGS. 1-4, the transmission assembly 14 includes one or more extension cables 46 and one or more contraction cables 48. The extension cables 46 and contraction cables 48 may be arranged to transfer opposing forces due to the suitability of cables for transferring "pulling" forces but not for transferring "pushing" forces. In some embodiments, a single transmission element may be used to transfer opposing (both pushing and pulling) forces.

In the embodiment of FIGS. 1-4, the transmission assembly 14 is routed down one or more legs of a user to reach the lower hinged assembly 16. In the illustrated example, the transmission assembly 14 is lightweight and flexible so as to allow minimal impediment of motion of the knee and hip joints of a user. The AFO may include one or more lubricating fluids or materials, disposed on an element or between two relatively-moving elements to reduce friction and increase efficiency. The extension cables and contraction cables may be formed from any suitable material, with examples including metal, Kevlar, and nylon.

The one or more extension cables and one or more contraction cables may each be housed in a cable sheath. The one or more cable sheaths may serve to support and house the extension cables and contraction cables. In the embodiment illustrated in FIGS. 1-4, the extension cables 46 and contraction cables 48 may be Bowden cables that transfer force via the movement of inner cables relative to a hollow sheath 50 or housing containing the inner cable. The one or more cable sheaths 50 may each be coupled to barrel adjustors 52. The barrel adjustors 52 allow for adjustment of the length of the sheaths 50 to adjust a baseline tension of the extension cables 46 or contraction cables 48. The one or more barrel adjustors 52 may be further coupled to the one or more cable brackets.

In the embodiment illustrated in FIGS. 1-4, each lower hinged assembly 16 includes an upright member 54 that serves as a mounting or support element for the components of the lower hinged assembly 16. Each upright member 54 may be additionally coupled to an orthotic cuff 56. The orthotic cuff 56 may be additionally coupled to a D-ring strap 58 and a Velcro strap 60. The orthotic cuff 56, D-ring strap 58, and Velcro strap 60 may be considered together as an attachment mechanism for coupling the lower hinged assembly 16 to a leg of a user at an attachment site, which may be between an ankle and a knee of the leg of the user.

Each upright member 54 may be additionally coupled to a bearing 62 or joint proximate an opposing end portion from the orthotic cuff 56. The one or more bearings 62 may each be coupled to a sprocket 64. Each of the one or more bearings 62 may serve as a freely-rotating and load-bearing connection between the upright member 54 and the sprocket 64. Each collection of an upright member 54, a sprocket 64, and a bearing 62 may be operably coupled to one another through connecting hardware, such as bolts and nuts or other suitable connecting hardware. The connecting hardware may be disposed through various adjustment holes defined by the upright member 54 for adjustability of the lower hinged assembly 16 based on the user's body type.

In some embodiments, additional brackets are attached to the lower hinged assembly based on the joint that is to be assisted. For example, as illustrated in FIGS. 1-4, one or more insole brackets 66 may be rotatably coupled with the upright member 54. The insole brackets 66 support the foot of the user and received torque that is to be applied to a walking surface of the user. The one or more insole brackets 66 may be formed from a metallic material, a polymeric material, and/or any other suitable rigid material. The one or more insole brackets 66 may be configured to be inserted into a user's footwear using thin elements without external straps.

The cable sheaths 50 may be coupled to the lower hinged assembly 16 by lower barrel adjusters 68 to anchor the lower end portions thereof. The lower barrel adjustors 68 may provide adjustment of the length of the sheaths 50 thereby providing adjustment of the baseline tension of the extension cables 46 or contraction cables 48. The one or more barrel adjustors 68 may be mounted on a support block 70. The one or more support blocks 70 may each be additionally coupled to the upright member 54.

After passing through the barrel adjusters 68 and exiting their sheaths 50, the extension cables 46 and the contraction cables 48 may couple to the sprockets 64. The sprockets 64 may clamp to each of the extension cables 46 and the contraction cables 48 on a first end portion and coupled to a single actuator pulley 42 in the control unit 12 on a second end portion. In various embodiments, an opposing pair may instead embodied in a single element with the capability to transfer both positive and negative forces. In some embodiments, the sprocket 64 may include any device for capturing force from a transmission assembly 14 to produce torque between two or more attachment points with at least one attachment point on each side of a user's joint (e.g., torque between the insole bracket 66 and the orthotic cuff 56).

Each upright member 54 and insole bracket 66, taken in combination, may be considered as a force-applying arm applying torque around an axis. In some instances, the axis is generally aligned with a body joint axis (e.g. an ankle joint axis). When a force is applied along a length of extension cables 46 or contraction cables 48, a force is applied to sprocket 64 and, in turn, insole bracket 66. Accordingly, the forces applied along the lengths of extension cables 46 and contraction cables 48 apply a force causing insole bracket 66 to rotate about the bearing 62 with respect to upright member 54.

In various embodiments, the extension cables 46 and/or the contraction cables 48 can be actuated based on acquired data from one or more sensors 72 within the exoskeleton device 10 in reference to use of the hinged assembly. As provided herein, one or more performance metrics may be determine based on the acquired data, which may include at least one of a posture position, joint positions/angles, joint moment, joint power, or spatiotemporal parameters of walking, including step/stride length and gait speed. In some examples, the one or more sprockets 64 may each be additionally coupled to a torque sensor 74 or a joint angle encoder configured to measure an angle at some point during an individual's gait cycle as the data point. The torque sensor 74 may be used to sense the torque force applied by the exoskeleton device 10 for assistance. The torque sensor 74 may be additionally coupled to the insole bracket 66. In some embodiments, the one or more sprockets 64 may be coupled to the corresponding one or more insole brackets 66 without an intermediate torque sensor 74. Additionally or alternatively, in various embodiments, the sensor 72 may be configured as one or more accelerometers coupled the lower hinged assembly 16 to provide information on the user's gait.

In some embodiments, the sensor 72 may be configured as one or more pressure/force sensors 76 may also be operably coupled with the insole bracket 66. The one or more pressure/force sensors 76 may be positioned on an upwardly and/or a downwardly facing surface of the insole bracket 66 in various embodiments to provide spatial pressure information across the foot surface. The one or more pressure/force sensors 76 may include force-sensitive resistors, piezo resistors, piezoelectrics, capacitive pressure sensors, optical pressure sensors, resonant pressure sensors, or other means of sensing pressure, force, or motion.

Figure 6:
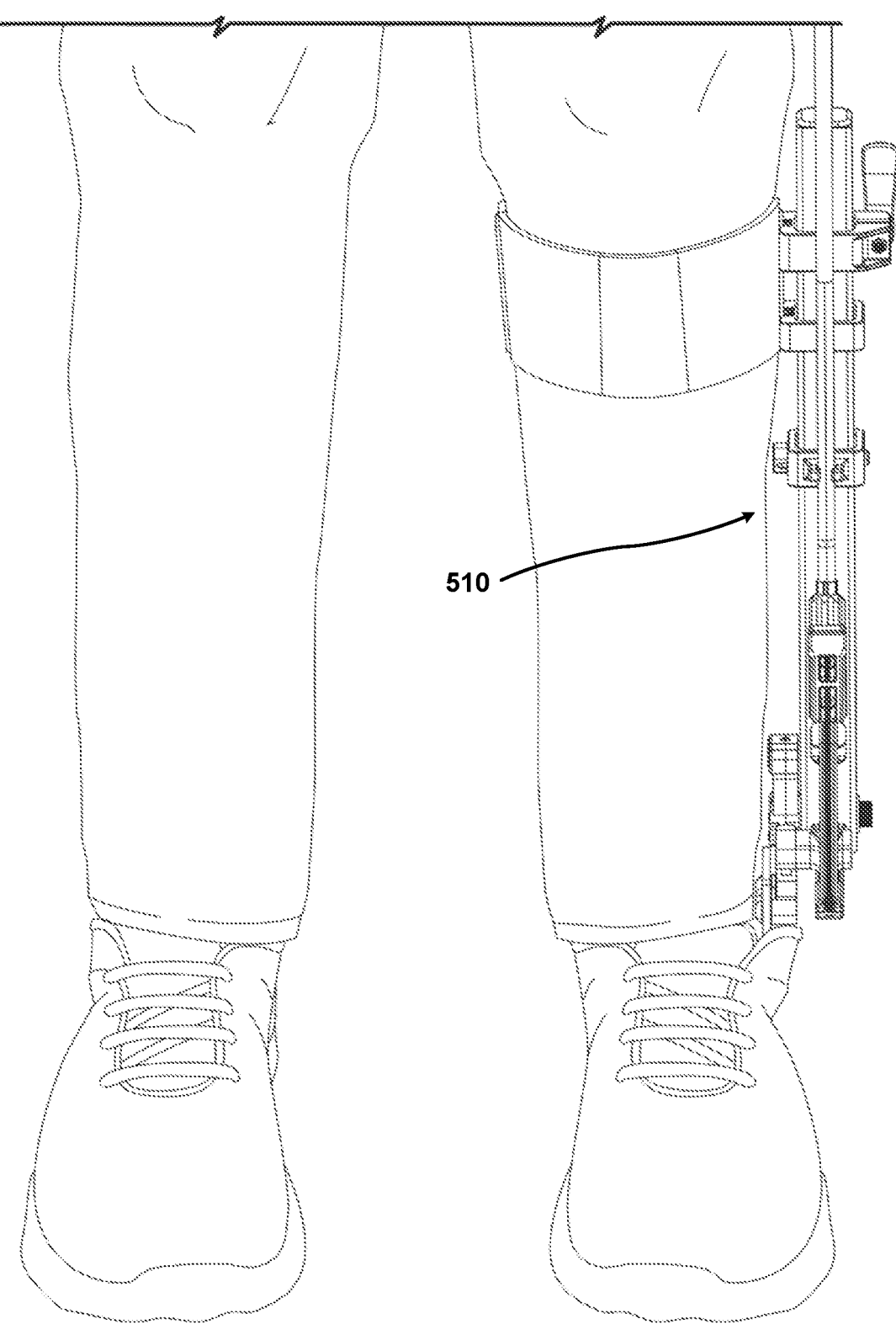
FIG. 6 is a depiction of aspects of the device of FIG. 5 being worn on the leg of a user.

FIGS. 5-10 depict a device 510 related to the embodiment(s) of FIGS. 1-4 (e.g., the device 10). It will be understood that descriptions of various components of the device 10 are also applicable to components of the device 510. The interior portion of the device 510 (the portion of the device that rests against the outer leg of a user wearing the device) is visible on the right side of FIG. 5, while the opposite (exterior) side is visible on the left. The device 510 is configured to aid or resist motion of a user's ankle and includes a lower hinged assembly 516 (analogous to the lower hinged assembly 16 of the device 10) that is coupled to an insole bracket 566. The lower hinged assembly 516 and other components are supported by an upright member 554 which may be fastened to the user's calf as shown in FIG. 6 using an orthotic cuff 560 (e.g., the cuff 60 of the device 10). As can be seen, member 554 is coupled to orthotic cuff 560 on a distal side of cuff 560, such that member 554, transmission linkage (e.g., cables), pulley 564, etc., are all located on the distal side of a user's leg. This prevents the assistive hardware from clipping the hardware on the other leg during walking, which greatly improves natural gait.

Figure 9:
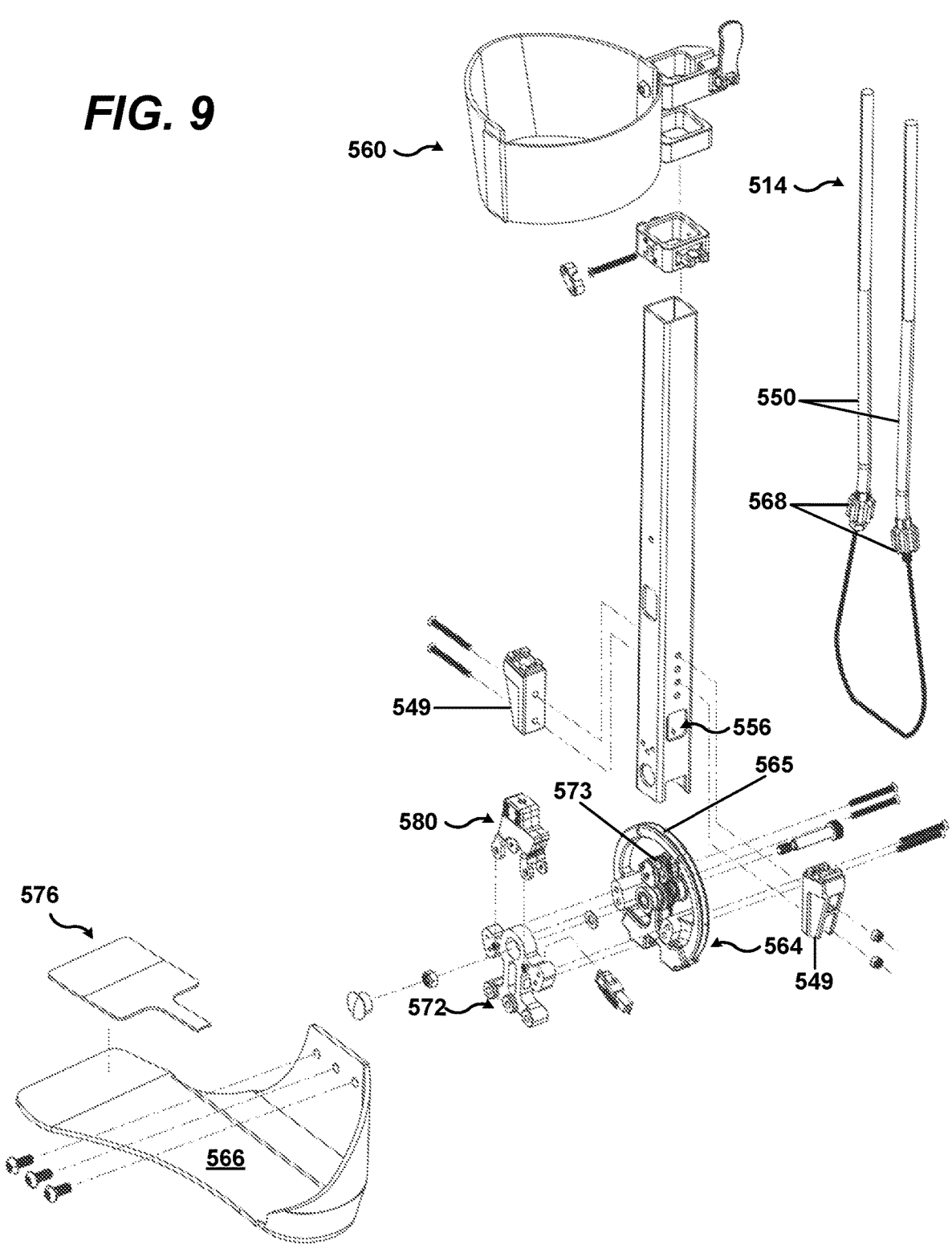
FIG. 9 is an exploded side isometric view of the device of FIGS. 5-7.

The lower hinged assembly 516 includes a pulley 564 mounted to a rotatable bearing 562. The pulley 564 is coupled to transmission assemblies 514 in which cables, wires, chains, cables, and combinations thereof, or similar structures coupled to actuators are passed through a rigid sheath 550 before passing through barrel adjustors 568. Sheath 550 is rigidly mounted to member 554 through illustrated mounts 549. This is accomplished by slotting an extension on barrel adjustor 568 into a receiving structure on mount 549, as best illustrated in FIG. 9. Extension cable 548 and a contraction cable 546 may be mutually coupled to pulley 564 and configured to rotationally actuate bearing 562. As shown, the pulley 562 is partially mounted within the rigid member 554. When an actuator pulls on the extension cable 548, the insole bracket 566 is configured to tend to rotate away from the rigid member to aid in plantar flexion (i.e., a torque is placed on the user's ankle to assist in plantar flexion and/or to resist dorsiflexion). When an actuator pulls on the contraction cable 546, the insole bracket 566 is configured to tend to rotate away from the rigid member 554 to aid in dorsiflexion (i.e., a torque is placed on the user's ankle to assist in plantar dorsiflexion and/or to resist plantar flexion).

As in the embodiments set forth above with respect to FIG. 1-4, transmission assemblies 514 may optionally include one or more (and preferably a pair) of Bowden cables, each including an outside sheath 550 and an interior cable 546. The sheath 550 is mounted to mount 549, which is itself mounted to member 554 proximate to pulley 562. In certain embodiments, sheath 550 is sufficiently rigid so as to provide support vertically, in compression, when member 554 and sheath 550 are oriented vertically. This arrangement may be useful in that, in such a vertical orientation, sheath 550 can provide vertical support for structures of the device located above those illustrated, for example, in FIGS. 5-10, such as, for example, a motor for actuating cables, batteries, control electronics, etc.

Figure 8:
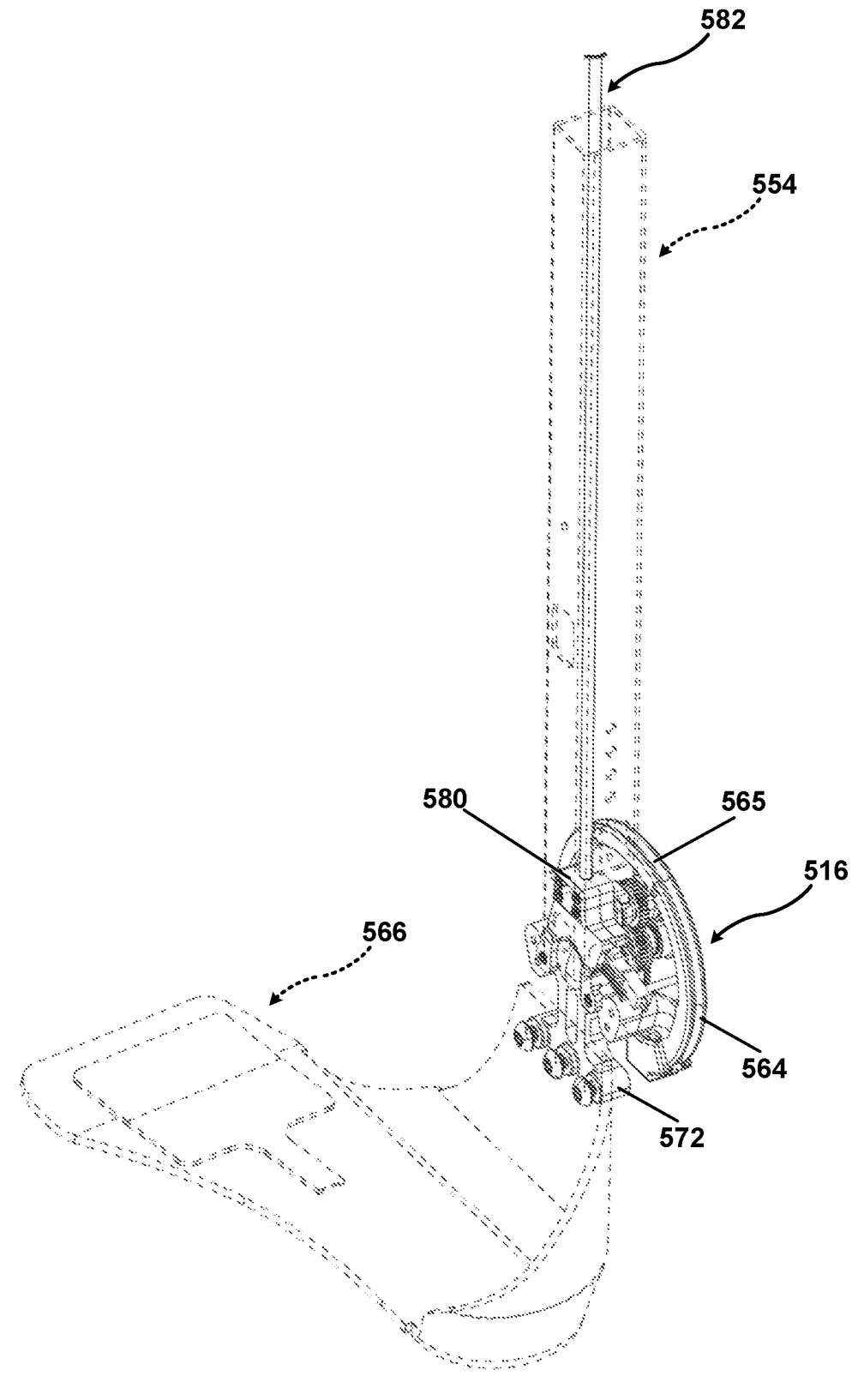
FIG. 8 is a schematic isometric view showing aspects of rotating element configured to apply a torque to a user's foot in relation to other components of the device of FIGS. 5-7.

The insole bracket or foot plate 566 may be provided with a pressure sensor 576 that detects forces exerted by a user's foot on the insole bracket 566. As shown, the pressure sensor includes one or more electrical leads 578 that are routed to a fixture 580 coupled to the hub of the pulley 564. Electrical signals may be carried from the pressure sensor 576 and from other sensors to one or more control units via an electrical cable 582 that may be configured to pass through the interior of the rigid member 554. The fixture 580 may include additional sensors or may be coupled to additional sensors, such as one or more torque sensors configured to produce electrical signals that indicate an amount of torque applied by the device to the ankle of a user wearing the device. As an example, a torque sensor 572 in FIG. 8 is coupled to or embedded in the fixture. Fixture 580 serves as a mounting interface for foot plate 566, and transfers rotational force from bearing 562 to foot plate 566. Accordingly, by measuring torque or strain applied to fixture 580, the torque being applied by the pulley to the foot plate may be measured and/or calculated. In some embodiments, the sensor 572 includes or more Wheatstone bridges or other resistive strain sensors whose outputs may be used to determine an amount of torque experienced at the user's ankle. It will be understood that any suitable sensor technologies may be used for the pressure sensor(s) 576 and the torque sensor(s), including, but not limited to any suitable optical or electrical sensors. In some embodiments signals from one or more sensors may be transmitted electrically over wires or wirelessly (e.g., using analog or digital radio frequency signaling), or optically via fiber-optic cables, as non-limiting examples.

In the device 510, the pulley 564 is mounted on a bearing 562 secured within the rigid member 554, through fasteners best visible in FIG. 9, which secure pulley 564 and bearing 562 to member 554, while enabling bearing 562 to freely rotate. The pulley has an outer hub and an open central area inside the hub. The pulley 564 and the rigid member 554 are jointly configured such that an upper portion of the hub of the pulley passes through an aperture 556 defined by rigid member. This allows the pulley to be mounted centrally in member 554, which in the examples shown is a tubular member having a square cross section, such that the long axis of member 554 passes through bearing 562 and is orthogonal to bearing 562's axis of rotation.

Figure 7:
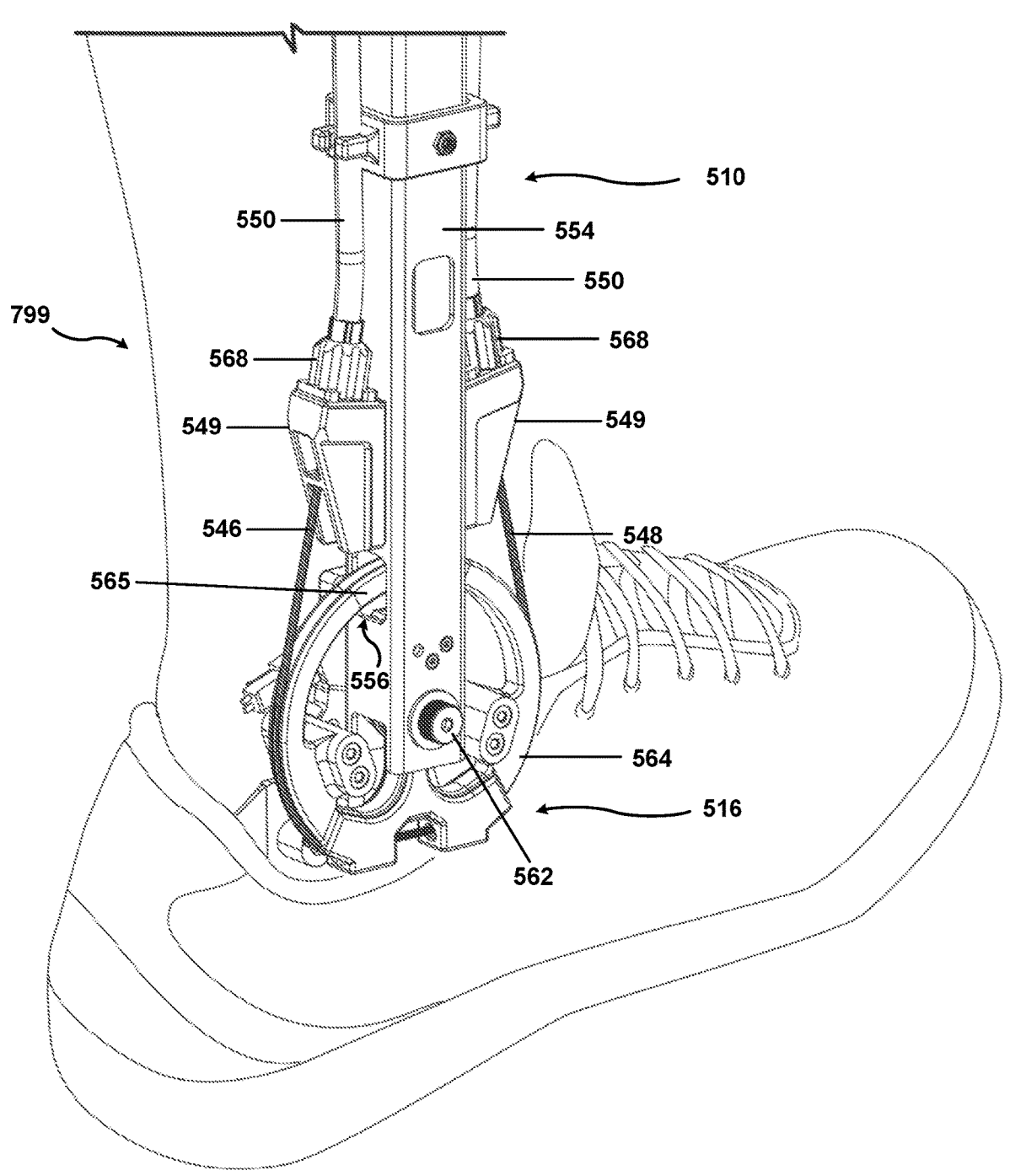
FIG. 7 is another depiction of aspects the device of FIG. 6 being worn on the leg of a user showing a rotating ankle assembly in detail.

Referring now to FIGS. 6 and 7, in the preferred examples, device 510 (or more preferably, a pair of devices 510) are mounted on the outside (i.e., the lateral side) of a user's leg, such that pulley 564 is on a lateral side of the user's ankle. This mounting arrangement is advantageous because locating assistive hardware on the inside, or medial side, of the user's legs and feet can cause the hardware to interfere with walking. Such disadvantageous placement often forces a user to adopt an unnatural gait in order to prevent the assistive assemblies of the respective legs from clipping one another during walking. This difficulty is addressed by placing the hardware on the lateral sides of the feet and legs.

It will be appreciated that during operation, pulley 564 is intended to rotate in a vertical plane, i.e., in a plane parallel to the user's sagittal plane. However, as a result of force applied by cables 546 and 548, pulley 564 will experience torque tending to deflect pulley 564 out of the plane parallel to the user's sagittal plane, which deflection will occur in either the medial or lateral direction. In conventional systems, this torque will tend to put stress on the interface between the bearing and whatever vertical structure to which the bearing is mounted. This stress may prematurely wear at that interface over time, causing early failure. Additionally, mounting a bearing and pulley to one side or the other of a vertical member, as is found in conventional systems, will tend to cause the member itself to deflect Preferred embodiments of the invention overcome this conventional difficulty by mounting the bearing 562 within a rigid, tubular member that is sufficiently stiff to resist deformation when the bearing is subjected to torque that would otherwise cause its associated pulley 564 to deflect out of the vertical plane. This is accomplished by, for example, choosing a stiff geometry for the member 554 (e.g., a square, triangular, hexagonal, or some other tubular geometry having a closed, circumferential cross section), arranging the bearing 562 along a centerline of the tubular member such that the walls of the member are arranged both sides of the interface, and otherwise surrounding the bearing-member interface (i.e., above and optionally below) with sufficient material to allow the pulley to resist deflection. It will be appreciated that inventive embodiments accomplish this, while accommodating rotation of the pulley, with a special design of member 554 and pulley 564, which will now be described.

As is described immediately above, the center of bearing 562 is arranged within rigid member 554, with the long axis of the rigid member 554 running through bearing 562, such that bearing 562 is supported on a lateral and medial sides by walls of member 554. This arrangement reduces torsional forces on the rigid member when the lower hinged assembly 516 is actuated by one the cables 546, 548. This arrangement also permits the bearing-pulley assembly to resist torsional forces tending to deflect it with respect to the member. The interface between the bearing/pulley and the member is made stiff and strong, in part, by surrounding that interface with the walls of member 554, both above and below the medial-lateral through hole, which is provided for mounting the bearing.

Figure 10:
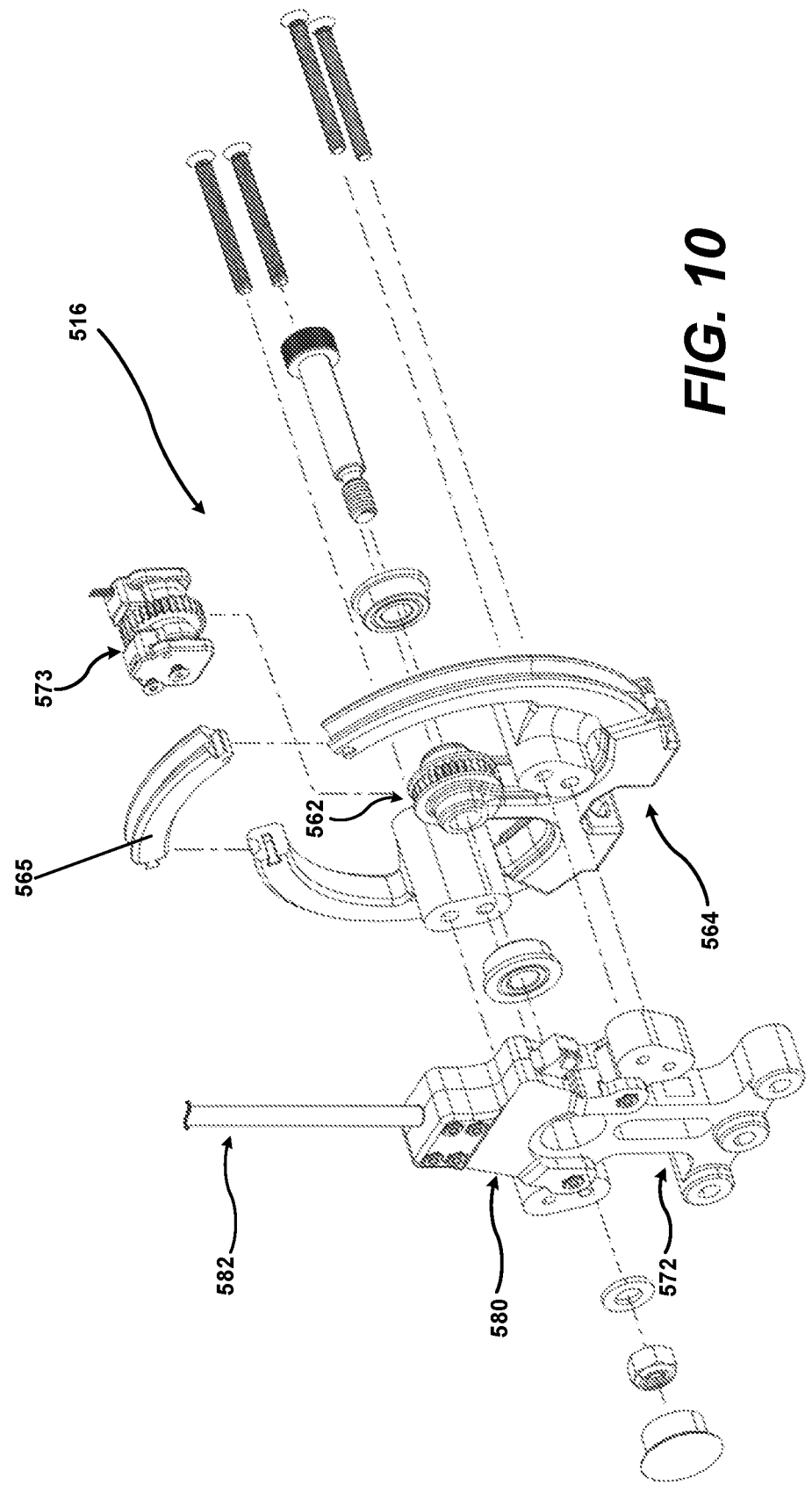
FIG. 10 is an exploded side isometric view of the device of FIGS. 5-7.

In order to accommodate this arrangement, member 554 defines a pair of apertures 556 arranged mutually collinearly and located above the bearing's axis of rotation. The pulley's hub or sheave includes a detachable bridge portion 565 that allows the pulley to be coupled to the rigid member 554 (which may be provided as prefabricated part) without requiring any disassembly of the rigid member 554 (or assembly of the rigid member 554 around the pulley 564). Referring now to FIGS. 9 and 10, during one exemplary assembly process, one or more subassemblies including bearing 562, pulley 564, and optionally, angle sensor 573 are inserted, singly or in combination, into an interior channel defined by the walls of member 554. The one or more subassemblies are then secured to member 554 using, at least, a through fastener about which bearing 562 may rotate (shown in FIG. 10). During the aforementioned assembly process, the sheave of the pulley 564 does not include removable bridge portion 565, which allows wing portions of the sheave to slip up on either side of the outside walls of member 554. After insertion of the one or more subassemblies described above into member 554, the removable bridge portion 565 of the pulley 564 is then assembled to bridge the gap in the sheave, creating a continuous sheave that arcs through the apertures 556 defined by member 554. This allows the sheave of the pulley to be rendered strong such that it can resist deformation as it is actuated by the cables, because the perimeter of the sheave is rendered into one continuous arctuate or circular perimeter. Bridge portion 565 may be coupled to pulley 565 by any suitable means, including by a snap, interference fit between keyed features, or a keyed tongue and groove arrangement on the respective parts, as shown in FIG. 9. While in the example described above, the removable portion of the sheave is shown as being centrally located on the sheave and located above the pulley's center of rotation (i.e., the bearing), these are not requirements. The sheave of the pulley could be located below the bearing, and the removable portion could be located anywhere along the arcuate perimeter of the sheave so long as assembly through the tubular member's apertures is possible.

In alternative embodiments, rather than being located partially inside and partially outside of the interiod of the extended tubular member, the pulley sheave and the extended tubular member are sized such that the entirety of the pulley is located within the interior of the extended tubular member. In such embodiments, transmission assemblies 514 (e.g., Bowden cables) may be routed entirely within the hollow interior of the extended tubular member to the actuator.

As is set forth above, in the exemplary embodiments, member 554 is a tubular member having a square cross section, but other geometries are possible and within the scope of the invention. For example, member 554 may have a rectangular, octagonal, hexagonal, or some other cross section having a closed polygonal geometry. In other embodiments, member 554 may have a non-polygonal closed cross section, such as a circular, ellipitical or other ovoid cross section. In the exemplary embodiment, the cross sectional area of the tubular member (i.e., the area defined by the closed perimeter) is constant throughout the member's vertical length, but this is not a requirement. It is contemplated that member 544 may taper, either positively or negatively, continuously, discontinuously, monotonically, or in a complex fashion, from its first end to its second end, depending on requirements.

As is set forth above, the device of the present disclosure may include an angle sensor 573 which is arranged to counter rotate with respect to bearing 562 through intermeshing teeth. This permits measurement of the degree of angular rotation of bearing 562, as well as measurement of the angular velocity of bearing 562.

FIG. 7 shows the device 510 positioned against an outer calf 799 of a user (the insole bracket 566 is omitted from this view.) The detachable portion 565 and the aperture 556 of the rigid member 554 are more clearly shown in this view. FIG. 8 shows the pulley 564 and related components in relation to the rigid member 554 and the insole bracket 566.

FIG. 9 is an exploded view showing the various components of the device 510, along with examples of suitable mechanical linkages (not separately labeled) for assembly of the device 510 from discrete components. In particular the aperture 556 of the rigid member 554 (along with the detachable portion 565) is clearly shown, along with the pulley 565, the fixture 580, and the torque sensor 572.

FIG. 10 is an exploded view showing only the lower hinged assembly 516 in greater detail. In particular, the pulley 564 and its hub, with the detachable portion 565 are clearly visible. Also clearly visible are the bearing 562 about which the pulley 564 rotates, the torque sensor 572, and the fixture 580, with the electrical cable 582 exiting the fixture 580 which provides strain relief for the electrical cable 582. Various nuts, bolts, and screws are shown to illustrate suitable components and methods for assembling the lower hinged assembly 516.

The rigid member 554 may be constructed out of any suitable material sufficient to withstand anticipated operating stresses, including torsional stresses. In some embodiments, the rigid member may be a hollow tube with a round, oval or rectangular cross section and may be formed from a material with a high strength-to-weight ratio, such as a carbon fibers within a polymer matrix. In some embodiments, the rigid member 554 is a hollow carbon fiber composite rod with a square cross-section of less than one inch in diameter. In some examples, the member 554 has a weight less than 400 grams for a length of 266.66 mm (i.e., less than 1.5 grams per millimeter). This permits advantageous tube lengths in the range of 150-450 mm to be realized to accommodate users of a variety of heights, while still providing sufficient strength and stiffness. In some examples, the rigid member 554 is configured such that, when a torque of up to 30 Newton-meters is applied to the pulley 564 by one of the cables 546, 548, the end of the rigid member 554 closest to the insole bracket 566 experiences a delectation relative of less than 5° measured with respect to the long axis of the rigid member 554 when no load is applied at the pulley 564.

Use of the present disclosure may offer a variety of advantages, which is provided by various combinations of the features provided herein. For example, the exoskeleton device provided herein may provide assistance to any number of joints of a user. Moreover, the assistance or resistance may be provided in a real-world environment, versus just in a lab. The exoskeleton may be minimally invasive to the user during day-to-day activities and manufactured at substantially reduced costs compared to various other assistance devices that are commercially available. The exoskeleton may provide assistance during some modes of operation specifically intended to improve mobility or posture. Additionally or alternatively, the exoskeleton may provide resistance a mode of operation designed to increase muscle recruitment during a function task (e.g. walking). The exoskeleton provided herein may be coupled with a feedback modality that allows for feedback regarding use of the exoskeleton device. For example, the user modality may alert a user when various performance goals are met. In addition, the exoskeleton may be remotes coupled to an electronic device. The electronic device may obtain data regarding the exoskeleton device and/or provided controls for altering usage of the exoskeleton device. In addition, the exoskeleton device may include one or more algorithms for intermittently adjusting the assistance level of the exoskeleton device based on the user performance. The assistance level may be changed from an initial assistance level that is obtained through various methods provided herein that make it quicker and more obtainable for a user with gait deficits to be fitted with the exoskeleton device.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

It is also important to note that the construction and arrangement of the elements of the invention as shown in the examples are illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

The exemplary structures disclosed herein are for illustrative purposes and are not to be construed as limiting. In addition, variations and modifications can be made on the aforementioned structures without departing from the concepts of the present invention and such concepts are intended to be covered by the following claims unless these claims by their language expressly state otherwise.

The invention claimed is:

1. A wearable assistive device, comprising:

an extended, tubular, structural member having a closed circumferential cross section, a first end and a second end defining a long axis through a center of the extended, tubular, structural member;

a rotational bearing disposed within the extended, tubular, structural member and positioned on the long axis near the second end of the extended, tubular, structural member, the rotational bearing being mounted to first and second opposing sidewalls of the extended, tubular, structural member and configured to rotate about an axis of rotation that is perpendicular to the first and second opposing sidewalls of the extended, tubular, structural member, and wherein the extended, tubular, structural member includes a third and fourth mutually parallel sidewalls;

an extension cable having a first end coupled to an actuator and a second end coupled to the rotational bearing; and a retraction cable having a first end coupled to the actuator and a second end coupled to the rotational bearing;

wherein, when the extension cable is pulled toward the actuator, the rotational bearing experiences a torque that tends to rotate the rotational bearing in a first direction;

wherein, when the retraction cable is pulled toward the actuator, the rotational bearing experiences a torque that tends to rotate the rotational bearing in a second direction;

wherein the device further comprises a pulley sheave coupled to the rotational bearing and configured to rotate with the rotational bearing, the second ends of the extension and retraction cables are coupled to the pulley sheave and the extended, tubular, structural member includes a pair of apertures defined in the third and fourth opposing sidewalls of the extended, tubular, structural member, through which a portion of the pulley sheave is configured to pass without contacting the extended, tubular, structural member, the pair of apertures being located between a location of the rotational bearing and the first end.

2. The wearable assistive device of claim 1, wherein the extended, tubular, structural member comprises a carbon fiber reinforced polymer composite.

3. The wearable assistive device of claim 1, wherein the extended, tubular, structural member has a polygonal cross section.

4. The wearable assistive device of claim 1, wherein the extended, tubular, structural member has a weight per unit length of less than 1.5 grams per mm.

5. The wearable assistive device of claim 1, wherein the second end of the extension cable and the second end of the retraction cable are coupled to each other.

6. The wearable assistive device of claim 1, wherein an upper portion of the pulley sheave is configured to be detachable from the pulley sheave to form a gap in the pulley sheave.

7. The wearable assistive device of claim 1, further comprising a calf cuff, wherein the extended, tubular, structural member is rigidly mounted to a distal side of the calf cuff such that the extended, tubular, structural member, extension and retraction cables and bearing are all arranged on a distal side of a user's leg when the device is worn.

8. The wearable assistive device of claim 1, further comprising:

an insole bracket coupled to the rotatable bearing and dimensioned to support a foot of a wearer of the assistive device;

wherein, when the rotational bearing experiences a torque that tends rotate the rotational bearing in the first direction, the insole bracket exerts a torque on an ankle of the user that assists dorsiflexion of the foot of the wearer and opposes plantar flexion of the foot of the wearer; and wherein, when the rotational bearing experiences a torque that tends to rotate the rotational bearing in the second direction, the insole bracket exerts a torque on the ankle of the wearer that assists plantar flexion of the foot of the wearer and opposes dorsiflexion of the foot of the wearer.

9. The wearable assistive device of claim 8, further comprising a force sensor disposed on or within the insole bracket and configured to generate a signal indicating a force applied by the foot of the user to the insole bracket.

10. The wearable assistive device of claim 9, further comprising a signal wire connected to the force sensor that extends within the extended, tubular, structural member and connects to a controller near the first end of the extended, tubular, structural member.

11. The wearable assistive device of claim 1, wherein the extended, tubular, structural member is configured such that when a torque of 0-75 Newton-meters is applied to the rotational bearing a deflection of the second end of the extended, tubular, structural member measured with respect to the long axis is less than 5 degrees.

12. The wearable assistive device of claim 11, further comprising a torque sensor or a rotation sensor coupled to the rotational bearing and configured to generate a signal indicating a net torque experienced by the rotational bearing or a degree of rotation of the rotational bearing.

13. The wearable assistive device of claim 12, further comprising a signal wire connected to the torque or rotation sensor that extends within the extended, tubular, structural member and connects to a controller near the first end of the extended, tubular, structural member.

14. The wearable assistive device of claim 1, wherein the extended, tubular, structural member's cross section has a maximal external dimension that varies with distance from the first end.

15. The wearable assistive device of claim 14, wherein the maximal external dimension of the extended, tubular, structural member's cross section is less than 5 inches.

16. The wearable assistive device of claim 1, wherein the extension and retraction cables are Bowden cables, each having an inner cable within a flexible outer sheath extending from at least the first end of the extended, tubular, structural member toward the second end of the extended, tubular, structural member and terminated in a barrel connector coupled to the extended, tubular, structural member near the rotational bearing, and wherein the inner cable is terminated at a pulley coupled to the bearing.

17. The wearable assistive device of claim 16, wherein the flexible outer sheath is configured to, when vertical, resist compressive force.

\* \* \* \* \*